US012619342B2

(12) United States Patent
Feng et al.

(10) Patent No.: US 12,619,342 B2
(45) Date of Patent: May 5, 2026

(54) COGNITIVE DETECTION OF USER INTERFACE ERRORS

(71) Applicant: International Business Machines Corporation, Armonk, NY (US)

(72) Inventors: Yuan Feng, Beijing (CN); Yan Yan Han, Xi'an (CN); Ling Zhuo, Beijing (CN); Tian Jiao Zhang, Xi 'an (CN); Jing Xu, Xi'an (CN); Xue Ying Zhang, Xi'an (CN); Su Li Hou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 827 days.

(21) Appl. No.: 17/575,095

(22) Filed: Jan. 13, 2022

(65) Prior Publication Data

US 2023/0221847 A1     Jul. 13, 2023

(51) Int. Cl.
*G06F 3/04845* (2022.01)
*G06F 11/34* (2006.01)
(Continued)

(52) U.S. Cl.
CPC ...... *G06F 3/04845* (2013.01); *G06F 11/3438* (2013.01); *G06F 40/247* (2020.01); *G06F 40/279* (2020.01); *G06N 5/01* (2023.01)

(58) Field of Classification Search
CPC ............. G06F 3/04845; G06F 11/3438; G06F 40/247; G06F 40/279; G06F 40/58; G06N 5/01
See application file for complete search history.

(56) References Cited

U.S. PATENT DOCUMENTS

<table>
<tr><td>8,990,774 B2</td><td>3/2015</td><td>Amintafreshi</td></tr>
<tr><td>10,949,225 B2</td><td>3/2021</td><td>Fernandes et al.</td></tr>
</table>

(Continued)

OTHER PUBLICATIONS

"Random forest." Wikipedia, Archived Jan. 11, 2022. Retrieved Mar. 11, 2025. https://web.archive.org/web/20220111220842/https://en.wikipedia.org/wiki/Random_forest (Year: 2022).*

(Continued)

*Primary Examiner* — Jennifer N Welch
(74) *Attorney, Agent, or Firm* — Garg Law Firm, PLLC; Rakesh Garg; Kimberly Zillig

(57) ABSTRACT

An embodiment includes detecting an interface element and an element attribute of the interface element in a series of views of a user interface, and then after an update of the user interface, detecting a candidate element and a candidate element attribute in a series of views of the updated user interface. The embodiment then determines that the updated user interface lacks any errors using a decision tree that includes comparisons of all interface elements of the user interface to corresponding candidate elements of the updated user interface. The embodiment then generates an optimized decision tree based at least in part on an analysis of the comparisons of the user interface to the updated user interface resulting in a condition that allows for the determining of a lack of errors based on comparisons of a subset of the interface elements to corresponding candidate elements.

19 Claims, 12 Drawing Sheets

(51) Int. Cl.
  *G06F 40/247*    (2020.01)
  *G06F 40/279*    (2020.01)
  *G06N 5/01*    (2023.01)

(56) References Cited

U.S. PATENT DOCUMENTS

| | | | | |
|---|---|---|---|---|
| 10,963,731 | B1 | 3/2021 | Sarkar et al. | |
| 11,762,939 | B2 | 9/2023 | Zhuo et al. | |
| 11,989,941 | B2 * | 5/2024 | Li | G06V 10/806 |
| 12,198,432 | B2 * | 1/2025 | Li | G06V 10/774 |
| 2008/0148235 | A1 * | 6/2008 | Foresti | G06F 11/3604 |
| | | | | 717/125 |
| 2009/0300423 | A1 * | 12/2009 | Ferris | G06F 11/36 |
| | | | | 714/38.1 |
| 2019/0259144 | A1 * | 8/2019 | Pathapati | G06T 7/0002 |
| 2020/0026536 | A1 * | 1/2020 | Li | G06F 9/454 |
| 2020/0073686 | A1 | 3/2020 | Hanke et al. | |
| 2020/0159647 | A1 * | 5/2020 | Puszkiewicz | G06F 18/241 |
| 2020/0249964 | A1 * | 8/2020 | Fernandes | G06F 9/451 |
| 2021/0081294 | A1 * | 3/2021 | Golubev | G06F 18/214 |
| 2021/0173768 | A1 | 6/2021 | Konyshev et al. | |
| 2023/0154146 | A1 * | 5/2023 | Li | G06V 20/46 |
| | | | | 382/159 |
| 2023/0154188 | A1 * | 5/2023 | Li | G06V 10/776 |
| | | | | 382/159 |

OTHER PUBLICATIONS

Atif M. Memon ("Automatically Repairing Event Sequence-Based Gui Test Suites for Regression Testing", ACM 2008, pp. 1-37).*
Parag C. Pendharkar ("An Exploratory Study of Object-Oriented Software Component Size Determinants and the Application of Regression Tree Forecasting Models", Elsevier, 2004, pp. 61-73).*
Tutorials for Web UI Test perspective, IBM, Mar. 3, 2021, 2 pages, doi: https://www.ibm.com/docs/en/devops-test-ui/10.0.2?topic=tutorials-web-ui-test-perspective.

\* cited by examiner

SERVICE REGISTRY
304

UI TESTING SYSTEM
306

API GATEWAY
302

USER DEVICE
308

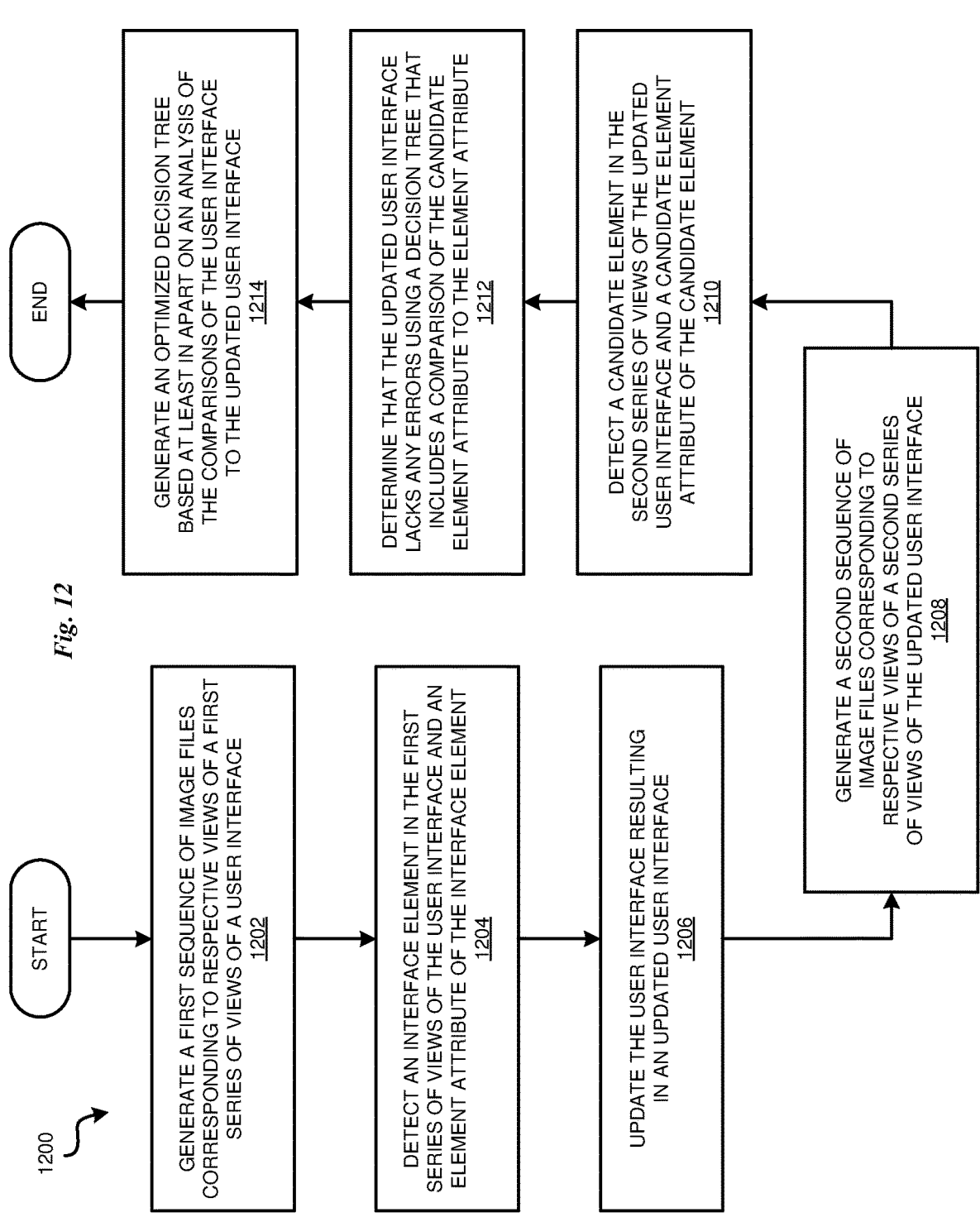

START

GENERATE A FIRST SEQUENCE OF IMAGE FILES CORRESPONDING TO RESPECTIVE VIEWS OF A FIRST SERIES OF VIEWS OF A USER INTERFACE
1202

DETECT AN INTERFACE ELEMENT IN THE FIRST SERIES OF VIEWS OF THE USER INTERFACE AND AN ELEMENT ATTRIBUTE OF THE INTERFACE ELEMENT
1204

UPDATE THE USER INTERFACE RESULTING IN AN UPDATED USER INTERFACE
1206

GENERATE A SECOND SEQUENCE OF IMAGE FILES CORRESPONDING TO RESPECTIVE VIEWS OF A SECOND SERIES OF VIEWS OF THE UPDATED USER INTERFACE
1208

DETECT A CANDIDATE ELEMENT IN THE SECOND SERIES OF VIEWS OF THE UPDATED USER INTERFACE AND A CANDIDATE ELEMENT ATTRIBUTE OF THE CANDIDATE ELEMENT
1210

DETERMINE THAT THE UPDATED USER INTERFACE LACKS ANY ERRORS USING A DECISION TREE THAT INCLUDES A COMPARISON OF THE CANDIDATE ELEMENT ATTRIBUTE TO THE ELEMENT ATTRIBUTE
1212

GENERATE AN OPTIMIZED DECISION TREE BASED AT LEAST IN APART ON AN ANALYSIS OF THE COMPARISONS OF THE USER INTERFACE TO THE UPDATED USER INTERFACE
1214

END

COGNITIVE DETECTION OF USER INTERFACE ERRORS

BACKGROUND

The present invention relates generally to a method, system, and computer program product for data processing. More particularly, the present invention relates to a method, system, and computer program product for cognitive detection of user interface errors.

Many software applications include a graphical user interface (also referred to herein more simply as a user interface) that includes various interface elements. The interface elements are computer-generated elements rendered on a display that provide input and/or output functionality for users. Examples of typical interface elements include input controls (e.g., checkboxes, buttons, and text fields), navigational controls (e.g., search fields, sliders, and icons), informational components (e.g., progress bars, message boxes, and tooltips), and containers (e.g., accordions).

While the software is being developed or updated, the user interface may be frequently tested to detect any unforeseen errors that may occur because of changes to the source code. For example, when a software application is created according to test-driven development practices, test cases for the user interface are created and repeatedly performed as the software is being developed to validate added functionality and confirm continued validation of previously-implemented functionality. The test cases are typically based on software requirements and successful completion of each test confirms satisfaction of the corresponding requirement.

SUMMARY

The illustrative embodiments provide for cognitive detection of user interface errors. An embodiment includes generating a first sequence of image files corresponding to respective views of a first series of views of a user interface for a software application under development, the first sequence of image files being generated during a first window of time. The embodiment also includes detecting an interface element in the first series of views of the user interface and an element attribute of the interface element, the element attribute being descriptive of the interface element. The embodiment also includes generating, after an update of the user interface resulting in an updated user interface, a second sequence of image files corresponding to respective views of a second series of views of the updated user interface, the second sequence of image files being generated during a second window of time, the second window of time occurring after completion of the first window of time. The embodiment also includes detecting a candidate element in the second series of views of the updated user interface and a candidate element attribute of the candidate element. The embodiment also includes determining that the updated user interface lacks any errors using a decision tree that includes comparisons of all interface elements of the user interface to corresponding candidate elements of the updated user interface, where the comparisons comprise determining that the candidate element matches the interface element based at least in part on a comparison of the candidate element attribute to the element attribute. The embodiment also includes generating an optimized decision tree based at least in part on an analysis of the comparisons of the user interface to the updated user interface resulting in a condition that allows for the determining of a lack of errors based on comparisons of a subset of the interface elements to corresponding candidate elements. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3 depicts a block diagram of an example service infrastructure that includes a user interface (UI) testing system in accordance with an illustrative embodiment;

FIG. 12 depicts a flowchart of an example process for detection of user interface errors in accordance with an illustrative embodiment.

DETAILED DESCRIPTION

Figure 1:
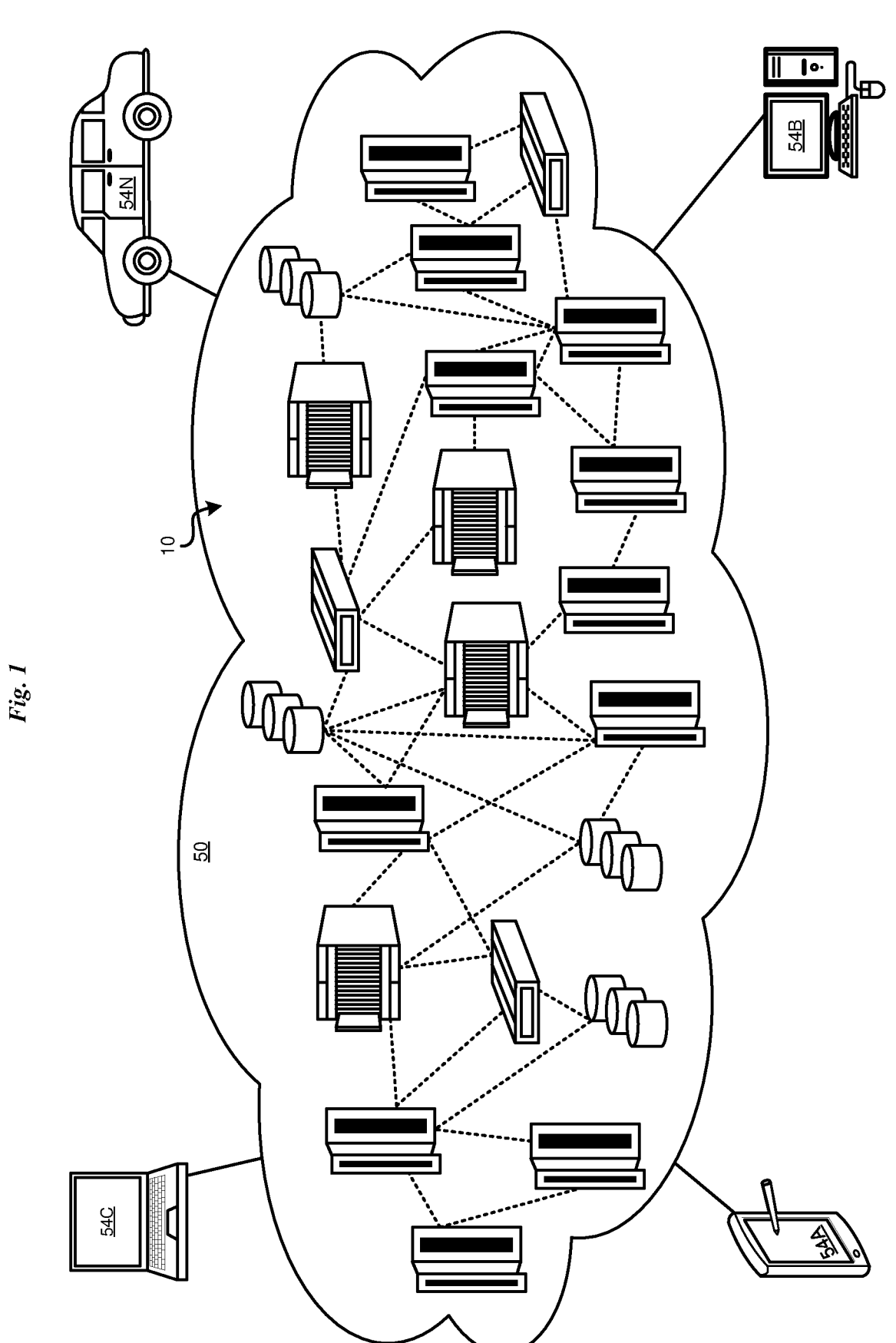
FIG. 1 depicts a cloud computing environment according to an embodiment of the present invention.

Many software applications require testing of interface elements of a user interface to confirm that the interface functionality is as expected. However, when changes are made to a user interface, considerable time, effort, and expense is involved in developing and performing new tests for testing the updated user interface using previous testing methodologies. In addition, previous methods of testing a user interface lack the ability to automate the testing of various aspects of the interface. For example, previous test methods lacked the ability to test for various stylistic errors, such as problems arising from different screen sizes, overlapping interface elements, and position changes of interface elements. As a result, manual testing has been required to check various aspects of a user interface, which tends to be expensive, time consuming, and leaves the testing vulnerable to human error.

In an illustrative embodiment, a user interface (UI) testing process begins before a user interface is updated to capture a baseline profile. The process develops element profiles of interface elements of the user interface and stores the element profiles in a profile data database. In some embodiments, the process generates a series of image files corresponding to respective views of the user interface. In some embodiments, the series of image files may be a series of still images of the user interface. In some embodiments, the series of image files may be frames of a video recording of the user interface. In some embodiments, the series of image files each depict the entire view of the user interface at respective different points in time. In some embodiments, the series of images include views of the user interface captured over a series of points in time while interface elements are activated, thereby capturing views of changes (if any) to the user interface that occur when each interface element is activated.

For example, if an interface element is a slider switch, the activation of the slider switch will involve triggering the slider switch to slide from one position to another. This transition of the slider switch from the first position to the second position will be captured in the series of images. In some embodiments, the process stores data indicative of the position of the slider switch before the switching action and stores data indicative of the position of the slider switch after the switching action. This allows the process to capture baseline action attributes of each of the interface elements of the user interface. In some embodiments, the series of images are stored in the profile data database for later use to compare the current state of the user interface to the state of the user interface after an update to the software associated with the user interface.

In some embodiments, the process also captures various other multi-modal information about each interface element of the user interface. For example, in some embodiments, the process captures element attributes by extracting the attributes from HTML or other source code of the associated software application. In some embodiments, the process captures element attributes from one or more of the series of images, for example using artificial intelligence-based image recognition techniques. Non-limiting examples of attributes captured by the process include, but are not limited to, an element identifier (ID), an XML path (Xpath) location of the element, a size of the element, an element name, an element label text, a class of the element, and/or the type of element.

In some embodiments, the process generates a data structure for element profiles of the interface elements. In some embodiments, the process stores the data structures in the profile data database. In some embodiments, the data structure includes mappings element attributes to associated element identifier data of interface elements.

In some embodiments, from time to time the software application associated with the user interface is updated, for example by an integrated development environment (IDE). For the sake of clarity, the user interface of the updated version of the software application is referred to herein as an updated user interface to distinguish it from the user interface of the version of the software application prior to the software update, regardless of whether the software update is intended to make any changes to the user interface. Also, for the sake of clarity, the term "candidate" is used herein to distinguish certain aspects of the updated user interface from those of the user interface prior to the update. For example, the interface elements of the updated user interface are referred to herein as candidate elements.

In some embodiments, the process develops profiles for the updated user interface and compares the profiles of the updated user interface to the profiles stored in profile data database that were generated by the process prior to the update. This comparison may reveal differences between the updated user interface version and the user interface prior to the update, allowing a user to easily identify unexpected or undesired changes to the user interface caused by the update that constitute errors so that the errors may be corrected.

In an illustrative embodiment, before the user interface is updated, the process develops element profiles of interface elements of the user interface and stores the element profiles in a profile data database. In an illustrative embodiment, the process receives the user interface and webpage HTML that generates at least a portion of the user interface. While webpage HTML is shown In an illustrative embodiment, alternative embodiments may receive other types of source code for the user interface.

In an illustrative embodiment, the process generates a series of image files corresponding to respective views of the user interface. Embodiments of the process may include using a camera and AI-based computer vision techniques to capture the images of the user interface while the user interface is rendered on a display, such as a computer monitor. Alternatively, embodiments of the process may use screen recording techniques to capture the images of the user interface while the user interface is rendered on a display. In some embodiments, the series of image files may be a series of still images of the user interface. In some embodiments, the series of image files may be frames of a video recording of the user interface.

In some embodiments, the series of image files each depict the entire view of the user interface at respective different points in time. In some embodiments, the series of images include views of the user interface captured over a series of points in time. In some embodiments, the process receives and analyzes the images to detect activation of interface elements and changes (if any) to the user interface that occur when interface elements are activated. In some embodiments, the process automatically activates each interface element of the user interface while the process is capturing the series of images. In some embodiments, the process automatically activates each interface element one at a time to allow images to be captured of the changes caused by each interface element individually. Alternatively, the interface elements are activated by a user or by the IDE while the process captures the series of images.

For example, if an interface element is a slider switch, the activation of the slider switch will involve triggering the slider switch to slide from one position to another. The process captures the transition of the slider switch from the first position to the second position in the series of images. In some embodiments, the process analyzes the series of images to detect the change in position of the slider switch, for example using AI-based image recognition techniques. The process stores data indicative of the position of the slider switch before the switching action and stores data indicative of the position of the slider switch after the switching action. This allows the process to capture baseline action attributes of each of the interface elements of the user interface. In some embodiments, the series of images are stored in a profile data database for later use to compare the current state of the user interface to the state of the user interface after an update to the software associated with the user interface.

In some embodiments, the process captures various other multi-modal information about each interface element of the user interface. For example, in some embodiments, the process captures element attributes by extracting the attributes from the webpage HTML or other source code of the associated software application. In some embodiments, the process captures element attributes from one or more of the series of images, for example using artificial intelligence-based image recognition techniques. Non-limiting examples of attributes captured by the process include, but are not limited to, an element identifier (ID), a size of the element, type of element, an XML path (Xpath) location of the element, an HTML Document Object Model (DOM) location of the element, an element label text, a class of the element, and an element name.

In some embodiments, the process generates a data structure for element profiles of the interface elements. In some embodiments, the process stores the data structures in a profile data database, such as the profile data database. In some embodiments, the data structure includes mappings of the element attributes to associated element identifier data of interface elements.

In an illustrative embodiment, after the software application is updated, the process develops element profiles of candidate elements of the updated user interface. The process also receives the element profiles that were generated for the interface elements before the software update. The process then attempts to match the interface elements to the candidate elements and determine whether each matched candidate element is indicative of a change to the corresponding interface element. In some embodiments, the process uses the profile data of the candidate elements and of the interface elements to determine whether the interface elements were changed by the update to the software application. In some embodiments, the process then outputs a test report that includes the comparison results for each of the interface elements, including indications of any changes detected by the process. The user can then review the test report to determine if the user interface appears and operates as intended after the update to the software application.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, training data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
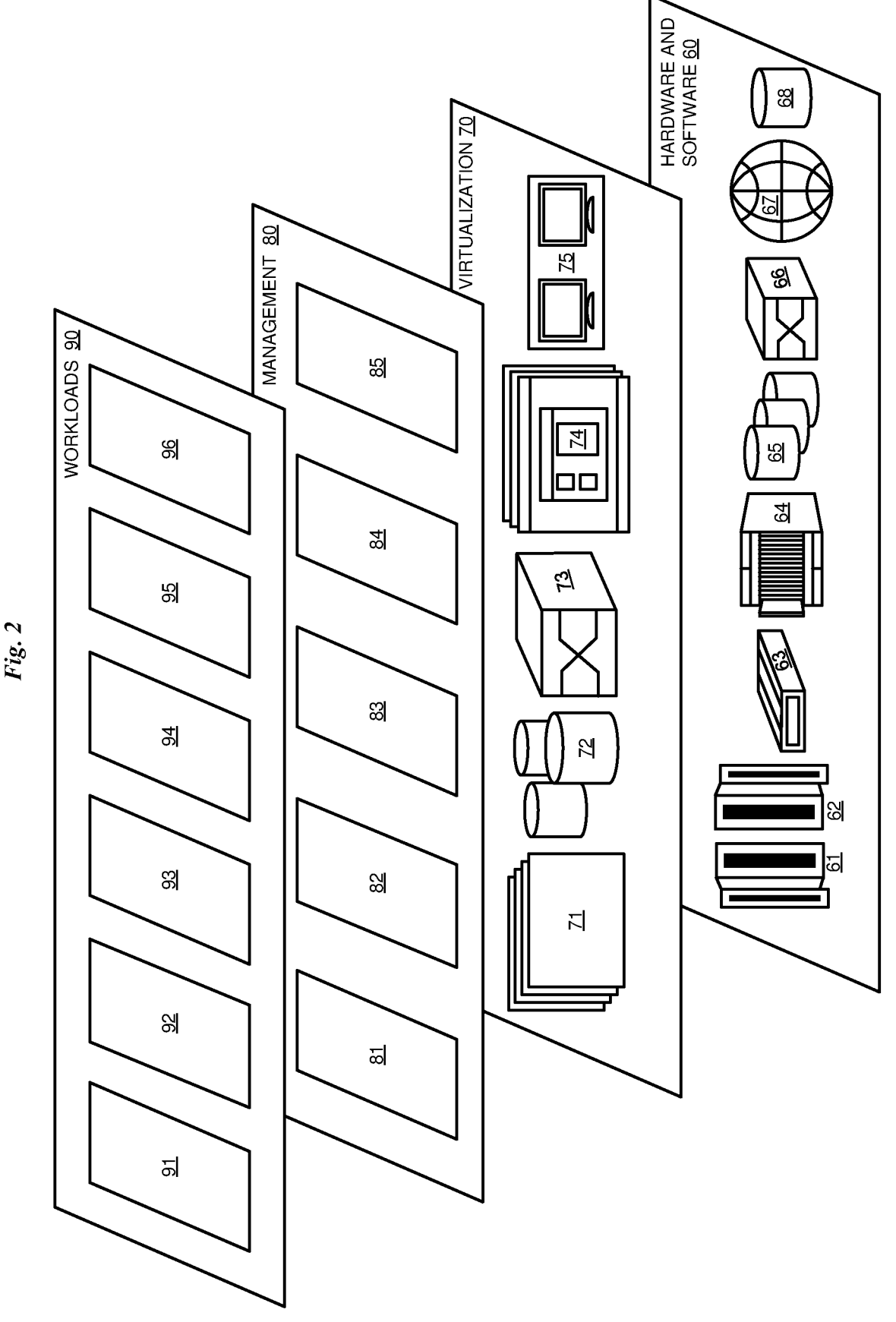
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in the context of the illustrated embodiments of the present disclosure, various workloads and functions 96 for user interface testing. In addition, workloads and functions 96 for user interface testing may include such operations as data analysis and machine learning (e.g., artificial intelligence, natural language processing, etc.), as described herein. In some embodiments, the workloads and functions 96 for user interface testing also works in conjunction with other portions of the various abstractions layers, such as those in hardware and software 60, virtualization 70, management 80, and other workloads 90 (such as data analytics processing 94, for example) to accomplish the various purposes of the disclosed embodiments.

Figure 3:
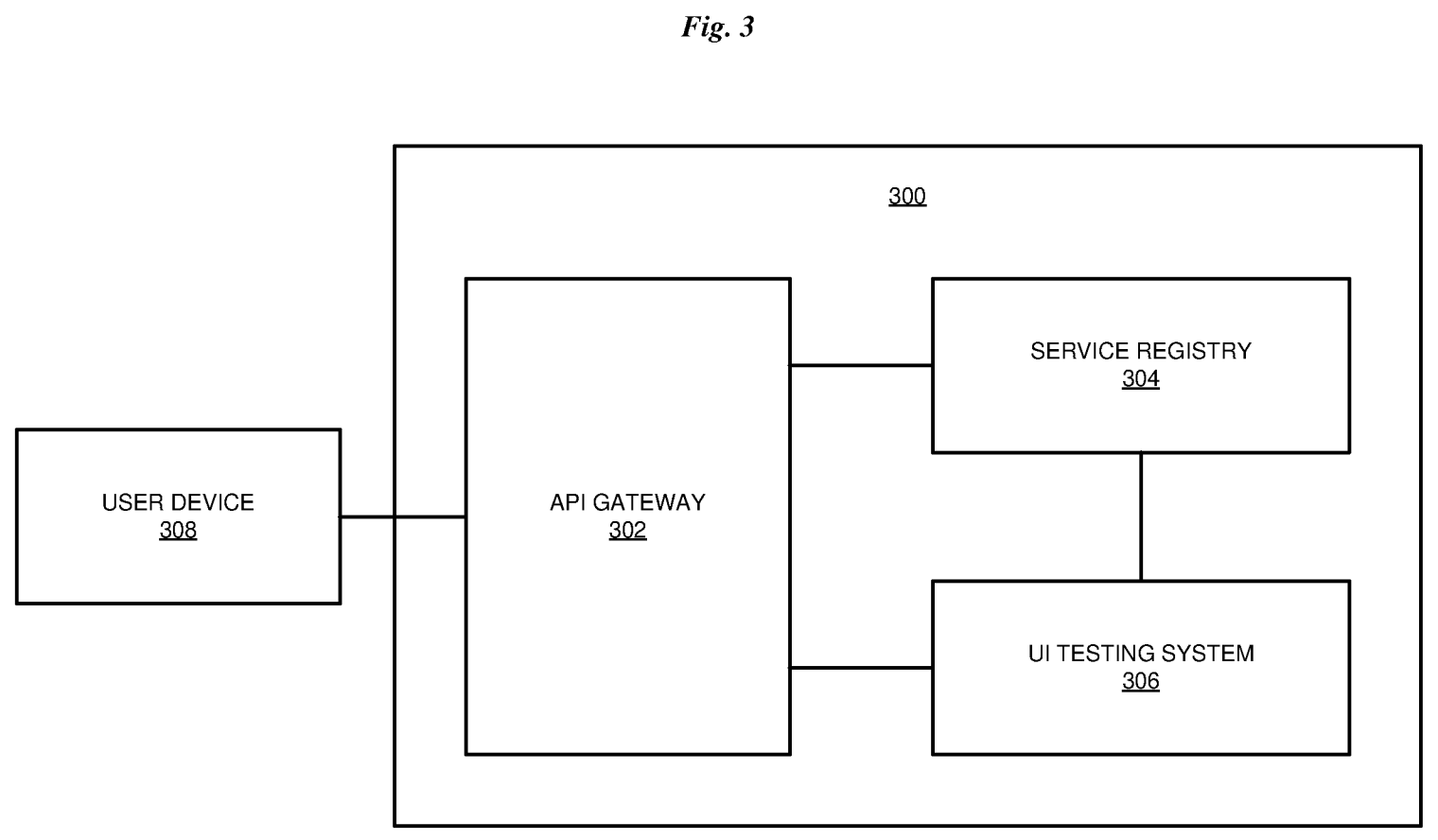

With reference to FIG. 3, this figure depicts a block diagram of an example service infrastructure 300 that includes a user interface (UI) testing system 306 in accordance with an illustrative embodiment. In some embodiments, the UI testing system 306 is deployed in workloads layer 90 of FIG. 2. By way of example, in some embodiments, UI testing system 306 is implemented as user interface testing 96 in FIG. 2.

In the illustrated embodiment, the service infrastructure 300 provides services and service instances to a user device 308. User device 308 communicates with service infrastructure 300 via an API gateway 302. In various embodiments, service infrastructure 300 and its associated UI testing system 306 serve multiple users and multiple tenants. A tenant is a group of users (e.g., a company) who share a common access with specific privileges to the software instance. Service infrastructure 300 ensures that tenant specific data is isolated from other tenants.

In some embodiments, user device 308 connects with API gateway 302 via any suitable network or combination of networks such as the Internet, etc. and use any suitable communication protocols such as Wi-Fi, Bluetooth, etc. Service infrastructure 300 may be built on the basis of cloud computing. API gateway 302 provides access to client applications like UI testing system 306. API gateway 302 receives service requests issued by client applications, and creates service lookup requests based on service requests. As a non-limiting example, in an embodiment, the user device 308 includes an integrated development environment (IDE), or is used to access an IDE, for software development and accesses the UI testing system 306 to test a user interface of the software under development.

In the illustrated embodiment, service infrastructure 300 includes a service registry 304. In some embodiments, service registry 304 looks up service instances of UI testing system 306 in response to a service lookup request such as one from API gateway 302 in response to a service request from user device 308. For example, in some embodiments, the service registry 304 looks up service instances of UI testing system 306 in response to requests from the user device 308 related to UI testing.

In some embodiments, the service infrastructure 300 includes one or more instances of the UI testing system 306. In some such embodiments, each of the multiple instances of the UI testing system 306 run independently on multiple computing systems. In some such embodiments, UI testing system 306, as well as other service instances of UI testing system 306, are registered in service registry 304.

In some embodiments, service registry 304 maintains information about the status or health of each service instance including performance information associated each of the service instances. For example, such performance information may include several types of performance characteristics of a given service instance (e.g., cache metrics, etc.). In some embodiments, the extended service registry 304 ranks service instances based on their respective performance characteristics, and selects top-ranking service instances for classification requests. In some such embodiments, in the event that a service instance becomes unresponsive or, unhealthy, the service registry will no longer provide its address or information about this service instance to other services.

Figure 4:
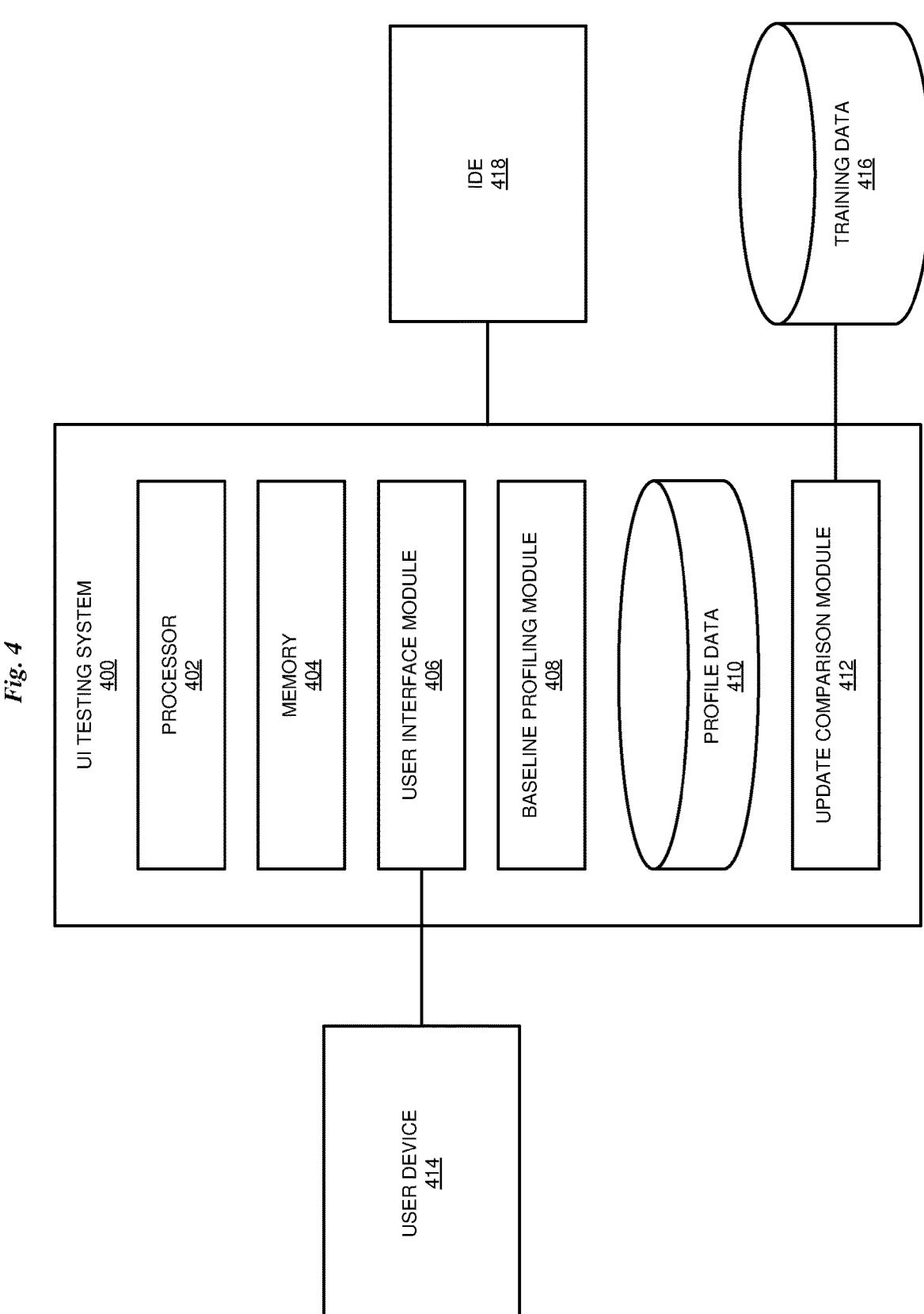
FIG. 4 depicts a block diagram of an example UI testing system in accordance with an illustrative embodiment.

With reference to FIG. 4, this figure depicts a block diagram of an example UI testing system 400 in accordance with an illustrative embodiment. In a particular embodiment, the UI testing system 400 is an example of the workloads and functions 96 for UI testing of FIG. 2.

In some embodiments, the UI testing system 400 includes a processor 402, memory 404, a user interface module 406, a baseline profiling module 408, a profile data database 410, and an update comparison module 412. In some embodiments, the UI testing system 400 tests a user interface being developed using a remote IDE 418. In some embodiments, the update comparison module 412 utilizes machine learning functionality that includes the use of a machine learning model that is trained using training data 416. In alternative embodiments, the UI testing system 400 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the UI testing system 400 includes a processing unit ("processor") 402 to perform various computational and data processing tasks, as well as other functionality. The processing unit 402 is in communication with memory 404. In some embodiments, the memory 404 comprises one or more computer readable storage media with program instructions collectively stored on the one or more computer readable storage media, with the program instructions being executable by one or more processors 402 to cause the one or more processors 402 to perform operations described herein.

The UI testing system 400 includes a user interface module 406, which may include a graphic or command line interface that allows a user to communicate with the UI testing system 400. For example, in some embodiments, the user interface module 406 is configured to recognize and take action in response to requests from the user device 414 related to testing a user interface. In some embodiments, a user device 414 may be any known type of computing device, such as a computer, tablet, or smart phone. In some embodiments, the user interface module 406 allows communication with the user device 414 via an API gateway (e.g., API gateway 302 of FIG. 3). In some embodiments, the user interface module 406 receives the user interface, including one or more bodies of text, images, video frames, or other interface elements from the user device 414 or from the IDE 418 for testing by the UI testing system 400.

In some embodiments, before the user interface is updated, the baseline profiling module 408 develops element profiles of interface elements of the user interface and stores the element profiles in the profile data database 410. In some embodiments, the baseline profiling module 408 generates a series of image files corresponding to respective views of the user interface. In some embodiments, the series of image files may be a series of still images of the user interface. In some embodiments, the series of image files may be frames of a video recording of the user interface. In some embodiments, the series of image files each depict the entire view of the user interface at respective different points in time. In some embodiments, the series of images include views of the user interface captured over a series of points in time while interface elements are activated, thereby capturing views of changes (if any) to the user interface that occur when each interface element is activated.

For example, if an interface element is a slider switch, the activation of the slider switch will involve triggering the slider switch to slide from one position to another. This transition of the slider switch from the first position to the second position will be captured in the series of images. In some embodiments, the baseline profiling module 408 stores data indicative of the position of the slider switch before the switching action and stores data indicative of the position of the slider switch after the switching action. This allows the baseline profiling module 408 to capture baseline action attributes of each of the interface elements of the user interface. In some embodiments, the series of images are stored in the profile data database 410 for later use to compare the current state of the user interface to the state of the user interface after an update to the software associated with the user interface.

In some embodiments, the baseline profiling module 408 also captures various other multi-modal information about each interface element of the user interface. For example, in some embodiments, the baseline profiling module 408 captures element attributes by extracting the attributes from HTML or other source code of the associated software application. In some embodiments, the baseline profiling module 408 captures element attributes from one or more of the series of images, for example using artificial intelligence-based image recognition techniques. Non-limiting examples of attributes captured by the baseline profiling module 408 include, but are not limited to, an element identifier (ID), an XML path (Xpath) location of the element, a size of the element, an element name, an element label text, a class of the element, and/or the type of element.

In some embodiments, the baseline profiling module 408 generates a data structure for element profiles of the interface elements. In some embodiments, the baseline profiling module 408 stores the data structures in the profile data database 410. In some embodiments, the data structure includes mappings element attributes to associated element identifier data of interface elements.

Figure 11:
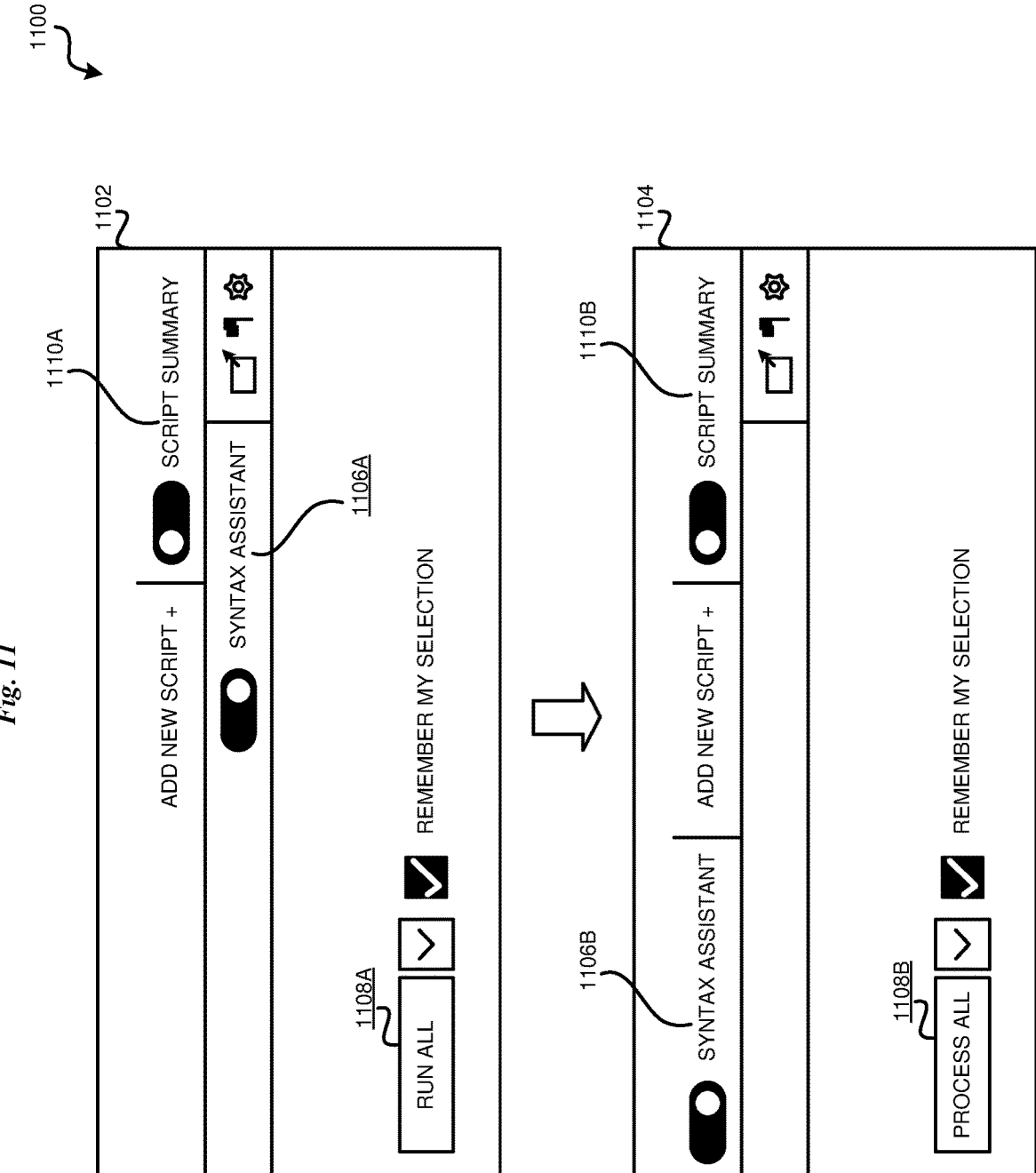
FIG. 11 depicts a comparison of a portion of a user interface before a particular software update and a corresponding portion of the user interface after the particular software update.

Referring now also to FIG. 11, this figure depicts a comparison 1100 of a portion of a user interface 1102 before a particular software update and a corresponding portion of the user interface 1104 after the particular software update. In some embodiments, from time to time the software application associated with the user interface is updated, for example by the IDE 418. For the sake of clarity, the user interface 1104 of the updated version of the software application is referred to herein as an updated user interface 1104 to distinguish it from the user interface 1102 of the version of the software application prior to the software update, regardless of whether the software update is intended to make any changes to the user interface. Also, for the sake of clarity, the term "candidate" is used herein to distinguish certain aspects of the updated user interface 1104 from those of the user interface 1102 prior to the update. For example, the user interface 1102 includes interface elements 1106A, 1108A, and 1110A that correspond with "candidate" elements 1106B, 1108B, and 1110B, respectively, of the updated user interface 1104.

As shown in FIG. 11, a software update may result in various types of changes to a user interface. As one example, the software update may cause repositioning of interface elements, such as causing interface element 1106A to be relocated to a different position on the updated user interface 1104 where candidate element 1106B is located. As another example, the software update may cause a change to the text or other appearance aspect of interface elements, such as causing the label of interface element 1108A to be changed from "RUN ALL" to "PROCESS ALL" as shown on candidate element 1108B of the updated user interface 1104. On the other hand, it is also possible for some interface elements to remain the same, such as interface element 1110A of the user interface 1102 that is unchanged compared to the candidate element 1110B of the updated user interface 1104.

Referring again to FIG. 4, the update comparison module 412 develops profiles for the updated user interface and compares the profiles of the updated user interface to the profiles stored in profile data database 410 that were generated by the baseline profiling module 408 prior to the update. This comparison may reveal differences between the updated user interface version and the user interface prior to the update, allowing a user to easily identify unexpected or undesired changes to the user interface caused by the update that constitute errors so that the errors may be corrected.

Figure 5:
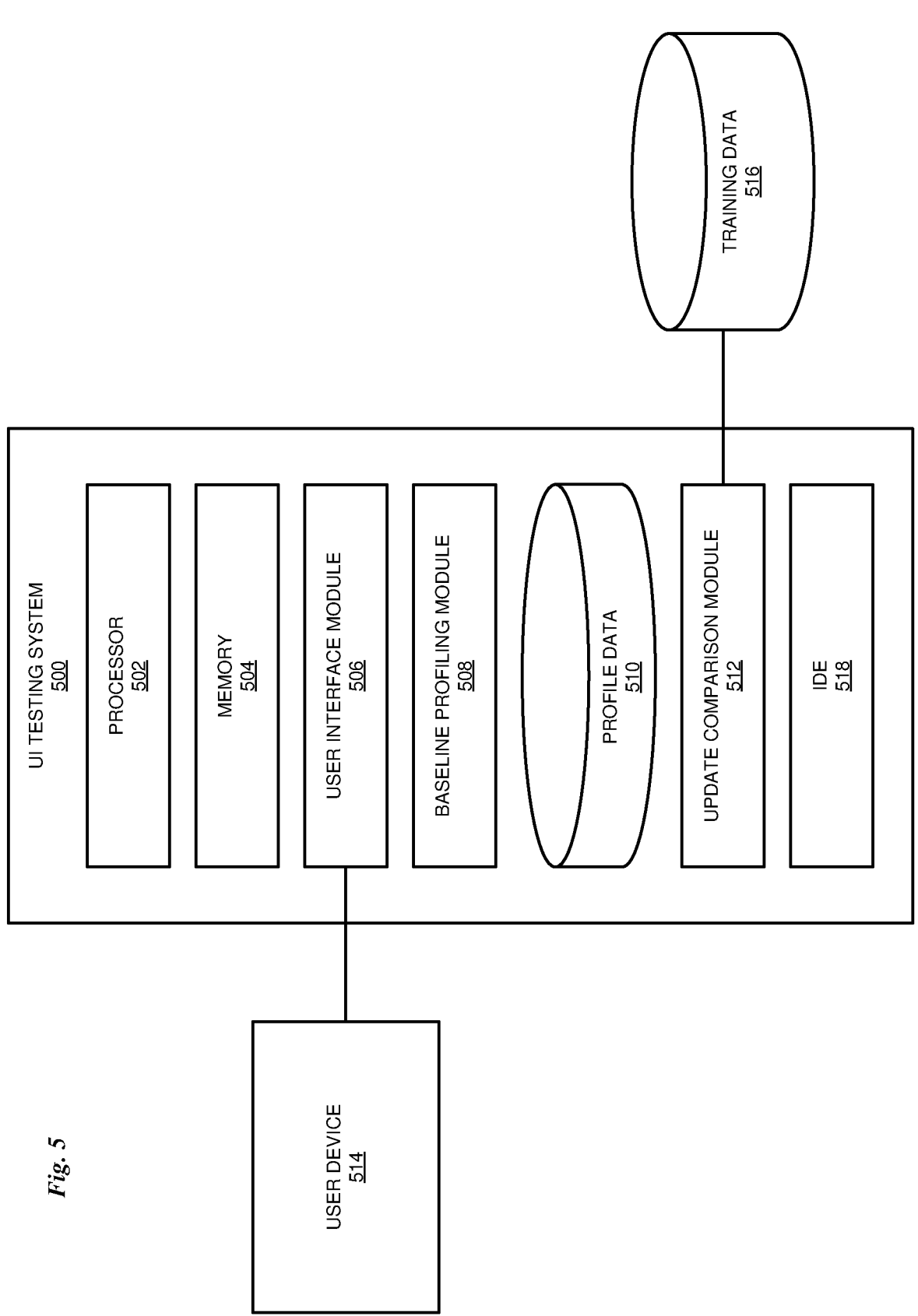
FIG. 5 depicts a block diagram of an example UI testing system in accordance with an alternative illustrative embodiment.

With reference to FIG. 5, this figure depicts a block diagram of an example UI testing system 500 in accordance with an alternative illustrative embodiment. In a particular embodiment, the UI testing system 500 is an example of the workloads and functions 96 for UI testing of FIG. 2.

In some embodiments, the description of the UI testing system 400 is equally applicable to UI testing system 500, except as noted below. Thus, the descriptions of the processor 402, memory 404, user interface module 406, baseline profiling module 408, profile data database 410, update comparison module 412, user device 414, and training data 416 of FIG. 4 applies equally to the processor 502, memory 504, user interface module 506, baseline profiling module 508, profile data database 510, update comparison module 512, user device 514, and training data 516, respectively, of FIG. 5. However, the UI testing system 500 further includes a local IDE 518 rather than the remote IDE 418 of FIG. 4. The embodiment shown in FIG. 5 thus allows for the disclosed UI testing system to be integrated with an IDE 518 or used with a separate IDE 418. Still further embodiments may include a combination of local and remote components of an IDE.

Figure 6:
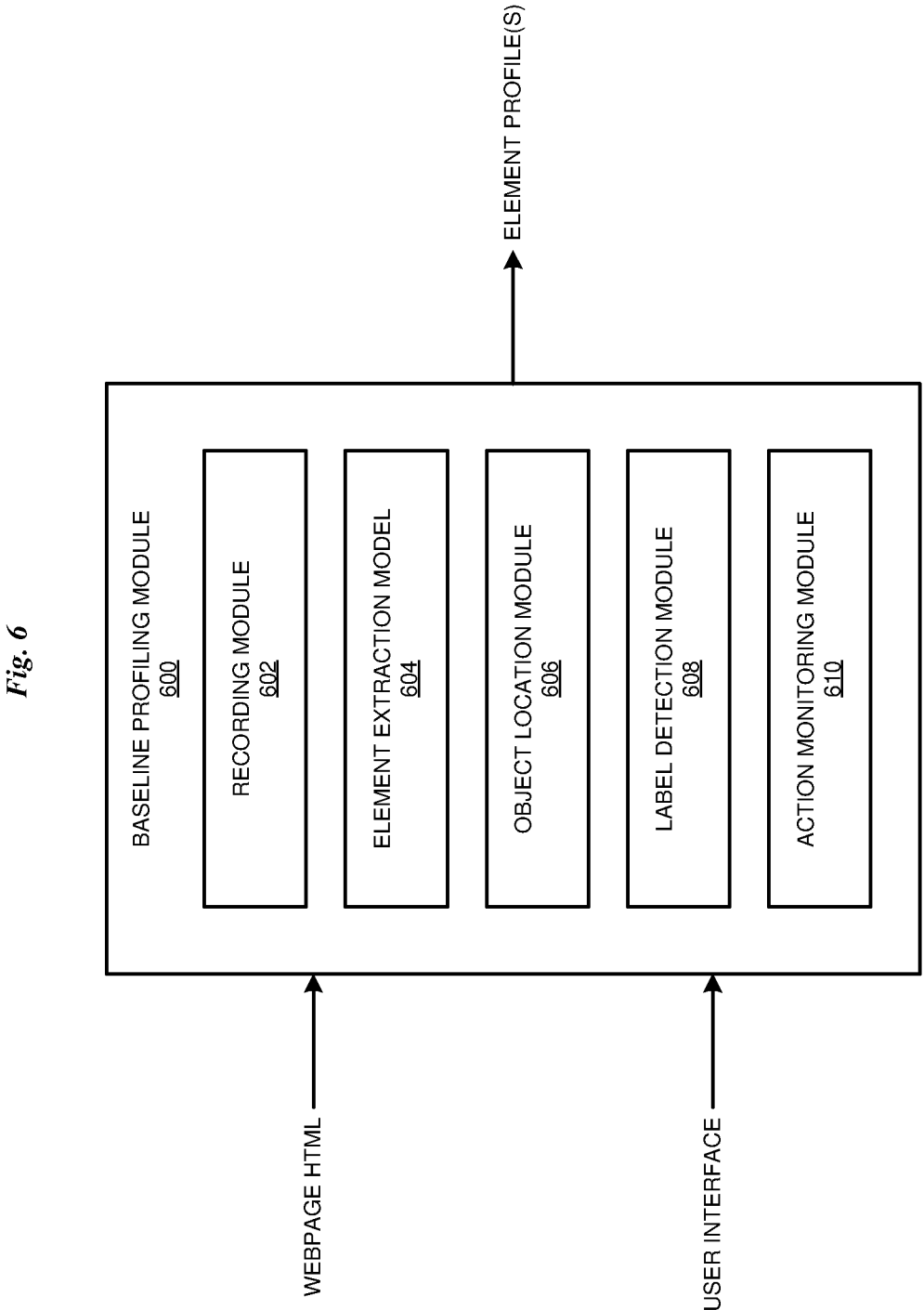
FIG. 6 depicts a block diagram of an example baseline profiling module in accordance with an illustrative embodiment.

With reference to FIG. 6, this figure depicts a block diagram of an example baseline profiling module 600 in accordance with an illustrative embodiment. In a particular embodiment, the baseline profiling module 600 is an example of the baseline profiling module 408 of FIG. 4.

In some embodiments, the baseline profiling module 600 includes a recording module 602, an element extraction module 604, an object location module 606, a label detection module 608, and an action monitoring module 610. In alternative embodiments, the baseline profiling module 600 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, before the user interface is updated, the baseline profiling module 600 develops element profiles of interface elements of the user interface and stores the element profiles in a profile data database, such as profile data database 410 of FIG. 4. In the illustrated embodiment, the baseline profiling module 600 receives the user interface and webpage HTML that generates at least a portion of the user interface. While webpage HTML is shown in the illustrated embodiment, alternative embodiments may receive other types of source code for the user interface.

In the illustrated embodiment, the recording module 602 generates a series of image files corresponding to respective views of the user interface. Embodiments of the recording module 602 may include using a camera and AI-based computer vision techniques to capture the images of the user interface while the user interface is rendered on a display, such as a computer monitor. Alternatively, embodiments of the recording module 602 may use screen recording techniques to capture the images of the user interface while the user interface is rendered on a display. In some embodiments, the series of image files may be a series of still images of the user interface. In some embodiments, the series of image files may be frames of a video recording of the user interface.

In some embodiments, the series of image files each depict the entire view of the user interface at respective different points in time. In some embodiments, the series of images include views of the user interface captured over a series of points in time. In some embodiments, the action monitoring module 610 receives and analyzes the images to detect activation of interface elements and changes (if any) to the user interface that occur when interface elements are activated. In some embodiments, the action monitoring module 610 automatically activates each interface element of the user interface while the recording module 602 is capturing the series of images. In some embodiments, the action monitoring module 610 automatically activates each interface element one at a time to allow images to be captured of the changes caused by each interface element individually. Alternatively, the interface elements are activated by a user or by the IDE while the recording module 602 captures the series of images.

For example, if an interface element is a slider switch, the activation of the slider switch will involve triggering the slider switch to slide from one position to another. The recording module 602 captures the transition of the slider switch from the first position to the second position in the series of images. In some embodiments, the action monitoring module 610 analyzes the series of images to detect the change in position of the slider switch, for example using AI-based image recognition techniques. The baseline profiling module 600 stores data indicative of the position of the slider switch before the switching action and stores data indicative of the position of the slider switch after the switching action. This allows the action monitoring module 610 to capture baseline action attributes of each of the interface elements of the user interface. In some embodiments, the series of images are stored in a profile data database, such as profile data database 410 of FIG. 4, for later use to compare the current state of the user interface to the state of the user interface after an update to the software associated with the user interface.

In some embodiments, the baseline profiling module 600 also uses the element extraction module 604, object location module 606, and label detection module 608 to captures various other multi-modal information about each interface element of the user interface. For example, in some embodiments, the element extraction module 604, object location module 606, and label detection module 608 capture element attributes by extracting the attributes from the webpage HTML or other source code of the associated software application. In some embodiments, the element extraction module 604 captures element attributes from one or more of the series of images, for example using artificial intelligence-based image recognition techniques. Non-limiting examples of attributes captured by the element extraction module 604 include, but are not limited to, an element identifier (ID), a size of the element, and/or the type of element. Non-limiting examples of attributes captured by the object location module 606 include, but are not limited to, an XML path (Xpath) location of the element and/or an HTML Document Object Model (DOM) location of the element. Non-limiting examples of attributes captured by the label detection module 608 include, but are not limited to, an element label text, a class of the element, and an element name.

In some embodiments, the baseline profiling module 600 generates a data structure for element profiles of the interface elements. In some embodiments, the baseline profiling module 600 stores the data structures in a profile data database, such as the profile data database 410. In some embodiments, the data structure includes mappings of the element attributes to associated element identifier data of interface elements.

Figure 7:
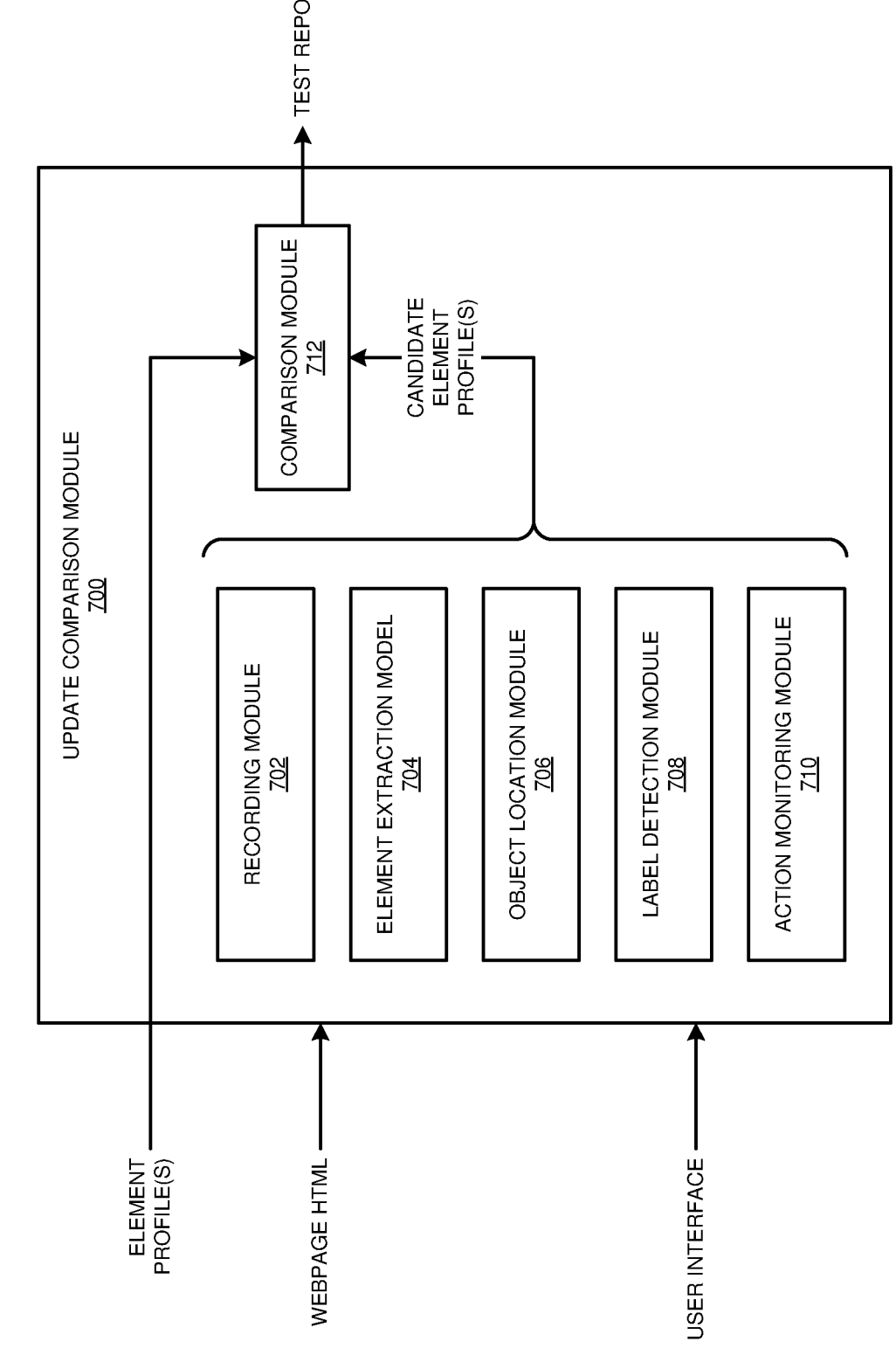
FIG. 7 depicts a block diagram of an example update comparison module in accordance with an illustrative embodiment.

With reference to FIG. 7, this figure depicts a block diagram of an example update comparison module 700 in accordance with an illustrative embodiment. In a particular embodiment, the update comparison module 700 is an example of the update comparison module 408 of FIG. 4.

In some embodiments, the update comparison module 700 includes a recording module 702, an element extraction model 704, an object location module 706, a label detection module 708, an action monitoring module 710, and a comparison module 712. In alternative embodiments, the update comparison module 700 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the descriptions of the recording module 602, element extraction module 604, object location module 606, label detection module 608, and action monitoring module 610 of FIG. 6 apply equally to the recording module 702, element extraction model 704, object location module 706, label detection module 708, and action monitoring module 710, respectively, of FIG. 7, except that the modules 702-710 process candidate elements of the updated user interface. In some embodiments, the modules 602-610 of FIG. 6 used by the baseline profiling module 600 are also used by the update comparison module 700 as modules 702-710.

In the illustrated embodiment, after the software application is updated, the update comparison module 700 develops element profiles of candidate elements of the updated user interface and provides the candidate element profiles to the comparison module 712. The comparison module 712 also receives the element profiles, for example from profile data database 510 of FIG. 5, that were generated for the interface elements before the software update. The comparison module 712 then attempts to match the interface elements to the candidate elements and determine whether each matched candidate element is indicative of a change to the corresponding interface element. In some embodiments, the comparison module 712 uses the profile data of the candidate elements and of the interface elements to determine whether the interface elements were changed by the update to the software application. In some embodiments, the comparison module 712 then outputs a test report that includes the comparison results for each of the interface elements, including indications of any changes detected by the comparison module 712. The user can then review the test report to determine if the user interface appears and operates as intended after the update to the software application.

Figure 8:
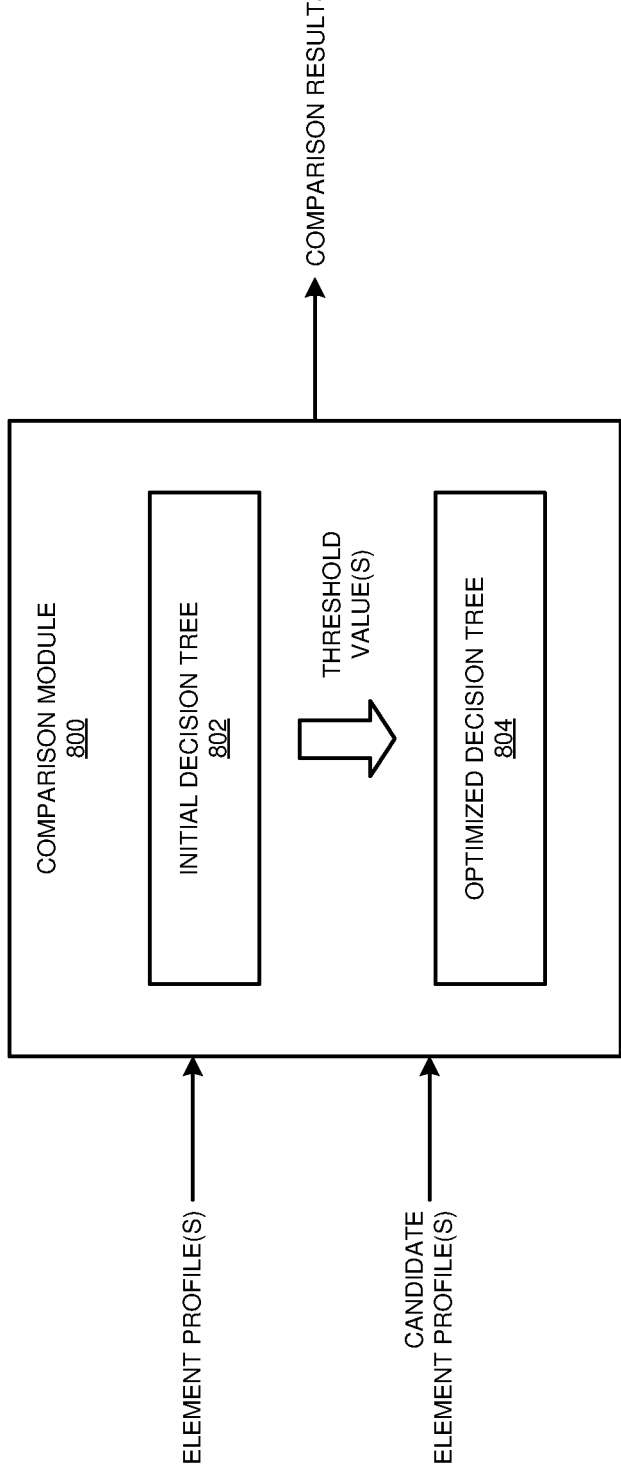
FIG. 8 depicts a block diagram of an example comparison module in accordance with an illustrative embodiment.

With reference to FIG. 8, this figure depicts a block diagram of an example comparison module 800 in accordance with an illustrative embodiment. In a particular embodiment, the comparison module 800 is an example of the comparison module 712 of FIG. 7.

In some embodiments, the comparison module 800 includes an initial decision tree 802 that is initially used to match the interface elements to the candidate elements and determine whether each matched candidate element is indicative of a change to the corresponding interface element. As the comparisons progress, the comparison module 800 trains the initial decision tree 802 to identify a least cost similarity path that will result in an optimized decision tree 804. In some embodiments, the training process may proceed for a predetermined number of interface elements. In some embodiments, the user interface may be a multi-page user interface, and the training process proceeds for a predetermined number of pages of the user interface. In some embodiments, the comparison module 800 continues the training process until some predetermined training criteria is satisfied.

In some embodiments, the initial decision tree 802 receives candidate element profiles of candidate elements of the updated user interface and also receives the element profiles, for example from profile data database 510 of FIG. 5, that were generated for the interface elements before the software update. The initial decision tree 802 uses the candidate element profiles and the element profiles to match candidate elements to interface elements. In some embodiments, the initial decision tree 802 iterates through each interface element of the user interface. For each interface element, the initial decision tree 802 calculates multi-modal similarity scores using data from the candidate element profiles and the element profile to determine which candidate element is most similar to the interface element of the current iteration. The initial decision tree 802 then determines which candidate element has the highest similarity score for the interface element of the current iteration and associates that candidate element with the current interface element as a match.

In some embodiments, the multi-modal similarity score is calculated by the initial decision tree 802 according to Expression (1):

$$S(t)=W(1)*S(1)+W(2)*S(2)+W(3)*S(3)+W(4)*S(4) \qquad (1)$$

In Expression (1), S(t) is the total similarity score, S(1), S(2), S(3), and S(4) are respective categorical similarity scores. In some embodiments, W(1), W(2), W(3), and W(4) are user-adjustable weight values for controlling the weight given to respective categorical similarity scores S(1), S(2), S(3), and S(4).

In some embodiments, S(1) is indicative of similarity as a function of element attributes: f1 (web attributes from the interface and candidate elements). In some embodiments, the S(1) score is calculated by the initial decision tree 802 according to Expression (2):

$$S(1) = \frac{\text{sum}(\delta i)}{\text{count(attribute)}} \qquad (2)$$

In Expression (2), $\delta_i$ is the similarity of attribute i of the interface and candidate elements, and sum($\delta_i$) is the sum of the similarities of every attribute of the interface and candidate elements. In some embodiments, the similarity of attribute i for each attribute of the interface and candidate elements is calculated by the initial decision tree 802 according to Expression (3):

$$\delta_i = 1 - \frac{\text{minimal edit distance of the attributes}}{\text{max(length(attributes))}} \qquad (3)$$

In Expression (3), the attributes are the respective attributes of the interface and candidate elements. As an example, suppose the ID attribute of an interface element is "pwd" and it is changed by the software update so that the corresponding candidate element has an ID attribute of "password." In this example, the minimal edit distance is 5 based on "password" being five characters longer than "pwd" and the max(length) of the attribute is 8 based on the length (number of characters) of "password" being 8 and being the longer of "password" and "pwd." The resulting $\delta_i$ similarity score would be $\delta_i=1-(\frac{5}{8})=0.375$. Other distance values may be used in alternative embodiments. However, the use of the minimal edit distance of the respective string values of every pair of attributes as shown in Expression (3) is used in some embodiments based on human readability aspects of the interface elements.

In some embodiments, S(2) is indicative of similarity as a function of element position and size: f2 (center distance (CD) and size difference (SD) of the interface and candidate elements). In some embodiments, the S(2) score is calculated by the 802 according to Expressions (4) and (5):

$$CD = \max\left(0, 1 - \frac{\text{distance between centers} + \text{abs}(UI \text{ size} - UUI \text{ size})}{UI \text{ size}}\right) \qquad (4)$$

$$SD = \sqrt{\text{width}^2 + \text{height}^2} \qquad (5)$$

In Expression (4), UI size is the size of the interface element in the user interface, and UUI size is the size of the candidate element in the updated user interface.

In some embodiments, S(3) is indicative of similarity as a function of element labels: f3 (label of the interface and candidate elements, synonym mapping list, translation dictionary). In some embodiments, the S(3) score is calculated by the initial decision tree 802 according to an algorithm that includes (1) checking the difference of the label strings of the interface and candidate elements under consideration and setting similarity=1 if they are identical; (2) Else if there is only one word that is different, check in a synonym mapping list and set similarity=1 if the different words are indicated to be synonyms; (3) Else calculate similarity using text encoding and similarity measurement technique. For example, in some embodiments, (3) may be implemented by encoding the words into vector representations and then calculating vector distances, such as using a word2vec technique.

In some embodiments, the S(3) score is calculated by the initial decision tree 802 according to an alternative algorithm if the initial decision tree 802 detects that the language of the label changed from the interface element to the candidate element. In some such embodiments, the alternative algorithm includes (1) using an API or dictionary to translate the label of the candidate element to the language of the interface element (possibly resulting in multiple translation strings); (2) Calculate the semantic similarity of each translation result to the label of the original interface element; and (3) Select the translation term having the highest similarity value as the final similarity.

In some embodiments, S(4) is indicative of similarity as a function of image changes caused by element action delta after action: f4 (difference between the image delta of the interface element and the image delta of the candidate element). Here, the "image delta" refers to changes, if any, detected in the series of images before and after activation of the interface element or candidate element. For example, if an interface element is a slider switch, the activation of the slider switch will involve triggering the slider switch to slide from one position to another. This transition of the slider switch from the first position to the second position will be captured in the series of images as the image delta for that interface element. If the corresponding candidate element is still the same slider switch, the activation of the same slider switch will still involve triggering the slider switch to slide from the first position to the second position, and will still be captured in the series of the updated user interface images as the image delta for that candidate element. On the other hand, If the corresponding candidate element has been changed to a button, the activation of the button will involve triggering the button to appear as if it is being pressed, which will be captured in the series of the updated user interface images as an image delta for that candidate element that is different from the image delta of the slider switch.

In some embodiments, the S(4) score is calculated by the initial decision tree 802 according to a similarity score using a Structural Similarity Index (SSIM) algorithm. In some embodiments, the algorithm includes first verifying that an action on the interface element and candidate element both get expected responses. When there is some uncertainty as to whether the interface and candidate elements under consideration are a match, the algorithm may include determining if the actions of the interface and candidate elements both get the same response by (1) collecting the image-delta information, and (2) calculating a similarity score of the two image deltas. In some embodiments, the image delta information may be collected by (1a) collecting a screenshot of the user interfaces before the interface element is activated and collecting a screenshot of the updated user interfaces before the candidate element is activated; (1b) for each of the interface element and the candidate element, collect a series screenshots after commencing the element action (e.g., every n intervals, such as n=0.1 seconds or n=0.2 seconds or n equals another time period selected based on an anticipated amount of time for the action to be completed) until the screenshots show a series of stable and consistent images; and (1c) calculate the difference between the final stable image for the interface element and the final stable image for the candidate image. In some embodiments, the initial decision tree 802 calculates the similarity score of for the interface and candidate elements under consideration based on a calculated difference between the two final images, where the difference between the two images is calculated using a Structural Similarity Index (SSIM) algorithm. In some embodiments, the images are converted to gray scale before applying the SSIM algorithm to calculate the difference value.

Figure 9:
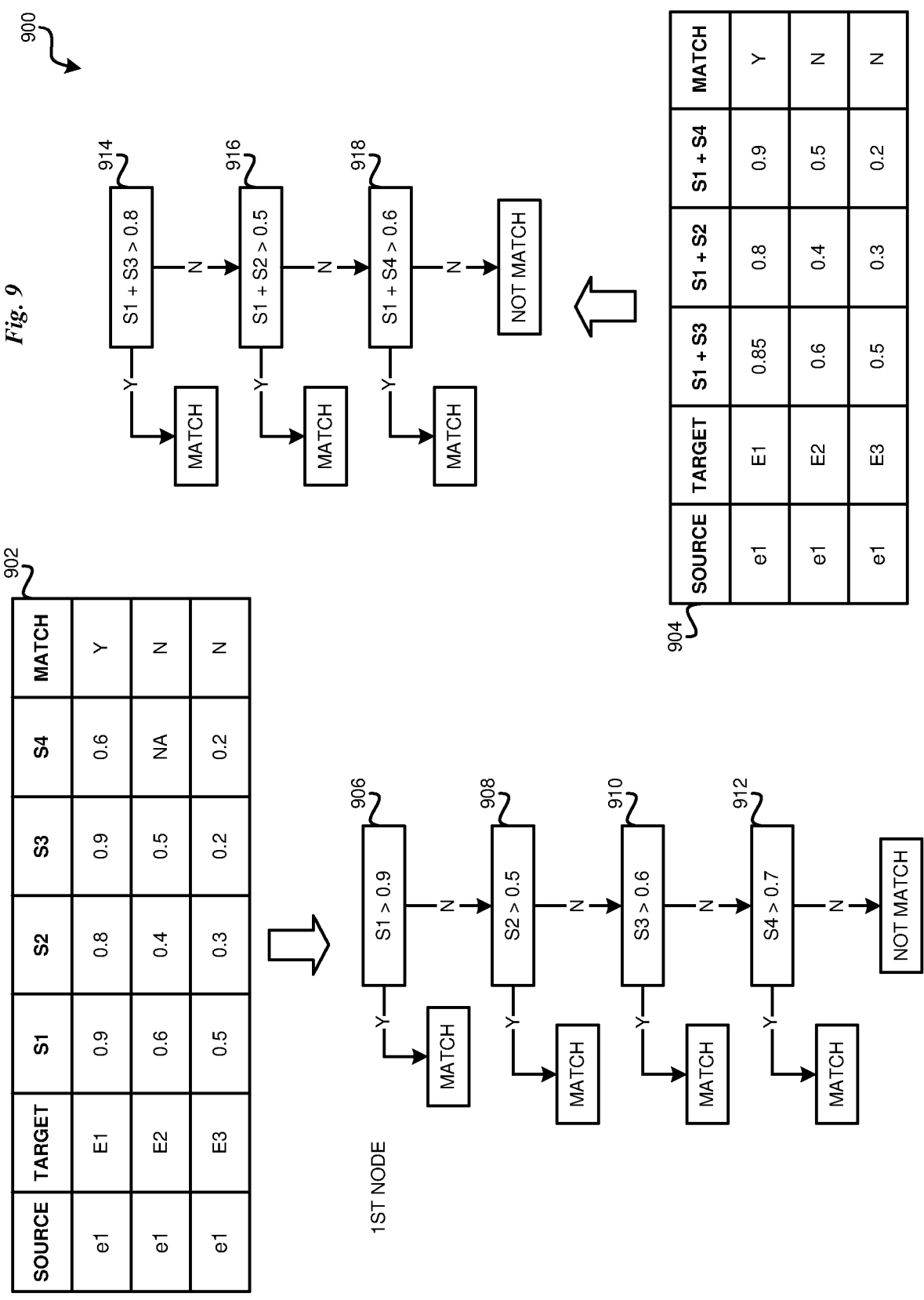
FIG. 9 depicts a block diagram of an example portion of an initial decision tree in accordance with an illustrative embodiment.

With reference to FIG. 9, this figure depicts a block diagram of an example portion of an initial decision tree 900 in accordance with an illustrative embodiment. In a particular embodiment, the initial decision tree 900 is an example of the initial decision tree 802 of FIG. 8.

In the illustrated embodiment, the table 902 shows data collected from a first branch of the decision tree that includes nodes 906-912. In the table 902 (and in table 904), a source element e1 refers to an interface element under consideration, meaning that the initial decision tree 900 is searching for a candidate element that matches the interface element e1. The target elements E1-E3 refer to respective candidate elements. The scores collected in the table 902 show the multi-modal similarity scores for S(1)-S(4) calculated at nodes 906-912 respectively. Each node is associated with a respective threshold value that indicates a match (e.g., 0.9 for S(1), 0.5 for S(2), etc.). In some embodiments, these threshold values are learned over time by the initial decision tree 802 based on values from past comparisons where the candidate element having the highest similarity score was considered a match for the interface element under consideration.

The table 904 shows data collected from a second level branch of the decision tree 802 that includes nodes 914-918. In the table 904, scores from combinations of the multi-modal similarity scores are shown as calculated at nodes 914-918. Each node is associated with a respective threshold value that indicates a match (e.g., 0.8 for S(1)+S(3), 0.5 for S(1)+S(2), etc.). In some embodiments, these threshold values are learned over time by the initial decision tree 802 based on values from past comparisons where the candidate element having the highest similarity score was considered a match for the interface element under consideration.

Figure 10:
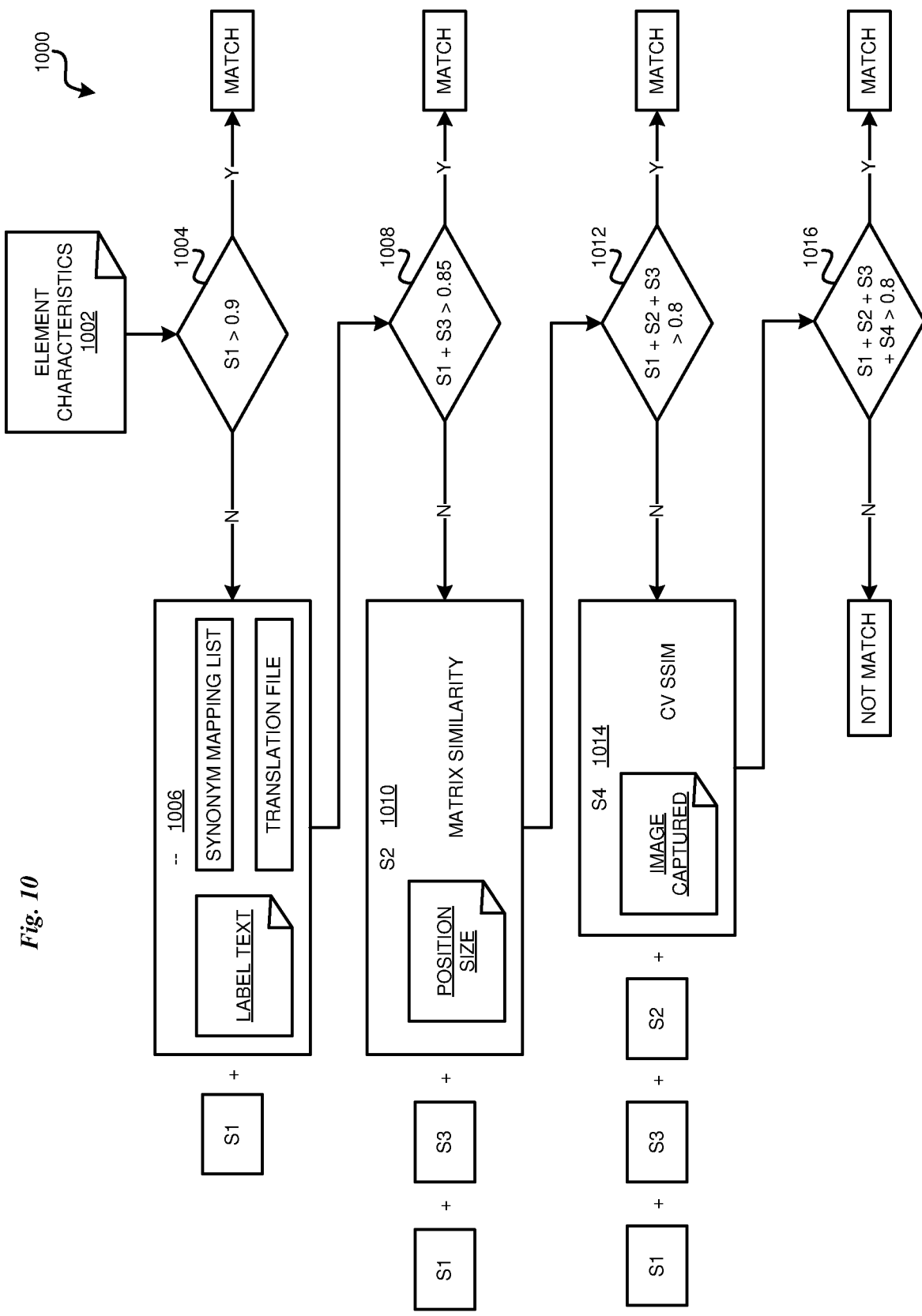
FIG. 10 depicts a block diagram of an example optimized decision tree in accordance with an illustrative embodiment.

With reference to FIG. 10, this figure depicts a block diagram of an example optimized decision tree 1000 in accordance with an illustrative embodiment. In a particular embodiment, the optimized decision tree 1000 is an example of the optimized decision tree 804 of FIG. 8.

The optimized decision tree 1000 combines the branches shown in FIG. 9 based on the data collected in tables 902 and 904. The optimized decision tree 1000 receives element characteristics from profile data at block 1002 and proceeds through the calculations as shown using the multi-modal similarity scores for S(1)-S(4) described above. Rather than having to perform every one of the multi-modal similarity scores for S(1)-S(4) for every combination of interface element and candidate elements, the decision nodes 1004, 1008, 1012, and 1016 are each associated with a respective threshold value that allows for early determination of a match. For example, the threshold value at decision block 1008 for the calculation made in block 1006 may result in a match without the need to continue with the calculations at blocks 1010 and 1014.

With reference to FIG. 12, this figure depicts a flowchart of an example process 1200 for detection of user interface errors in accordance with an illustrative embodiment. In a particular embodiment, the UI testing system 400 of FIG. 4 or UI testing system 500 of FIG. 5 carries out the process 1200.

In an embodiment, at block 1202, the process generates a first sequence of image files corresponding to respective views of a first series of views of a user interface for a software application under development. In some embodiments, the first sequence of image files is generated during a first window of time. Next, at block 1204, the process detects an interface element in the first series of views of the user interface and an element attribute of the interface element. In some embodiments, the element attribute is descriptive of the interface element. Next, at block 1206, the process updates the application software resulting in an updated user interface. Next, at block 1208, the process generates a second sequence of image files corresponding to respective views of a second series of views of the updated user interface. In some embodiments, the second sequence of image files are generated during a second window of time. In some embodiments, the second window of time occurs after the update and after completion of the first window of time. Next, at block 1210, the process detects a candidate element in the second series of views of the updated user interface and a candidate element attribute of the candidate element. Next, at block 1212, the process determines that the updated user interface lacks any errors using a decision tree that includes comparisons of all interface elements of the user interface to corresponding candidate elements of the updated user interface. In some embodiments, the comparisons comprise determining that the candidate element matches the interface element based at least in part on a comparison of the candidate element attribute to the element attribute. Next, at block 1214, the process generates an optimized decision tree based at least in part on an analysis of the comparisons of the user interface to the updated user interface resulting in a condition that allows for the determining of a lack of errors based on comparisons of a subset of the interface elements to corresponding candidate elements.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
generating, by rendering from an application executing on a data processing system, a user interface on a display apparatus, and by capturing from the rendering of the user interface a screen recording, a first sequence of image files corresponding to respective views of a first series of views of a user interface, the first sequence of image files being generated from frames of the screen recording during a first window of time;
causing, by executing a detecting instruction, a detection of an interface element in the first series of views of the user interface and an element attribute of the interface element, the element attribute being descriptive of a stylistic characteristic of the interface element;
updating at least one interface element of the user interface, the updating causing executing a second screen recording and automatically activating each element of the user interface during the second screen recording;
generating, responsive to rendering from the application executing on the data processing system an updated user interface from the application on the display apparatus and capturing from the rendering of the updated user interface the second screen recording, a second sequence of image files corresponding to respective views of a second series of views of the updated user interface during activating each element of the user interface, the second sequence of image files being generated from frames of the second screen recording during a second window of time, the second window of time occurring after a completion of the first window of time;
causing, by executing the detecting instruction, a detection of a candidate element in the second series of views of the updated user interface and a candidate element attribute of the candidate element;
establishing, in a decision tree, a correspondence between a first interface element and a first candidate element responsive to a multi-modal similarity score computed using a profile of the first interface element and a profile of the first candidate element, the multi-modal similarity score indicating that the first interface element is more similar to the first candidate element relative to a second candidate element;

executing, using the decision tree data structure that includes comparisons of all interface elements of the user interface to corresponding candidate elements of the updated user interface, a comparison function over all interface elements of the user interface to the corresponding elements of the updated user interface, the comparison function outputting a determination that the updated user interface lacks any stylistic errors, the stylistic errors comprising overlapping interface elements, wherein the determining that the updated interface lacks any stylistic errors comprises determining that the candidate element matches the interface element based at least in part on a comparison of the candidate element attribute to the element attribute;
executing an optimization function, the optimization function generating an optimized decision tree based at least in part on a plurality of comparisons of the user interface to the updated user interface resulting in the determination that the updated user interface lacks any stylistic errors, and based on comparisons of a subset of the interface elements to corresponding candidate elements.

2. The method of claim 1, further comprising:
generating a first data structure for an element profile of the interface element in a non-volatile computer memory, wherein the generating of the first data structure comprises mapping the element attribute to the interface element.

3. The method of claim 2, further comprising:
detecting an element action of the interface element by activating the interface element during the first window of time and comparing views of the first series of views captured before and after the activating of the interface element.

4. The method of claim 3, wherein the generating of the first data structure further comprises mapping the element action to the interface element.

5. The method of claim 4, further comprising:
detecting a candidate element action of the candidate element by activating the candidate element during the second window of time and comparing views of the second series of views captured before and after the activating of the candidate element.

6. The method of claim 5, further comprising:
generating a second data structure for a candidate element profile of the candidate element in the non-volatile computer memory, wherein the generating of the second data structure comprises mapping the candidate element attribute and the candidate element action to the candidate element.

7. The method of claim 1, wherein the detecting of the element attribute comprises recognizing element text associated with the interface element in at least one of the first series of views using natural language processing.

8. The method of claim 7, wherein the detecting of the candidate element attribute comprises recognizing candidate text associated with the candidate element in at least one of the second series of views using the natural language processing.

9. The method of claim 8, wherein the comparison of the candidate element attribute to the element attribute comprises retrieving a synonym of the candidate text and comparing the synonym to the element text.

10. The method of claim 8, wherein the comparison of the candidate element attribute to the element attribute comprises retrieving a translation of the candidate text and comparing the translation to the element text.

11. The method of claim 1, wherein the comparison of the candidate element attribute to the element attribute comprises calculating a similarity score based on a plurality of aspects of the candidate element and the interface element.

12. A computer program product, the computer program product comprising one or more computer readable storage media, and program instructions collectively stored on the one or more computer readable storage media, the program instructions executable by one or more processors to cause the one or more processors to perform operations comprising:

generating, by rendering from an application executing on a data processing system, a user interface on a display apparatus, and by capturing from the rendering of the user interface a screen recording, a first sequence of image files corresponding to respective views of a first series of views of a user interface, the first sequence of image files being generated from frames of the screen recording during a first window of time;

causing, by executing a detecting instruction, a detection of an interface element in the first series of views of the user interface and an element attribute of the interface element, the element attribute being descriptive of a stylistic characteristic of the interface element;

updating at least one interface element of the user interface, the updating causing executing a second screen recording and automatically activating each element of the user interface during the second screen recording;

generating, responsive to rendering from the application executing on the data processing system an updated user interface from the application on the display apparatus and capturing from the rendering of the updated user interface the second screen recording, a second sequence of image files corresponding to respective views of a second series of views of the updated user interface during activating each element of the user interface, the second sequence of image files being generated from frames of the second screen recording during a second window of time, the second window of time occurring after a completion of the first window of time;

causing, by executing the detecting instruction, a detection of a candidate element in the second series of views of the updated user interface and a candidate element attribute of the candidate element;

establishing, in a decision tree, a correspondence between a first interface element and a first candidate element responsive to a multi-modal similarity score computed using a profile of the first interface element and a profile of the first candidate element, the multi-modal similarity score indicating that the first interface element is more similar to the first candidate element relative to a second candidate element;

executing, using the decision tree data structure that includes comparisons of all interface elements of the user interface to corresponding candidate elements of the updated user interface, a comparison function over all interface elements of the user interface to the corresponding elements of the updated user interface, the comparison function outputting a determination that the updated user interface lacks any stylistic errors, wherein the determining that the updated interface lacks any stylistic errors comprises determining that the candidate element matches the interface element based at least in part on a comparison of the candidate element attribute to the element attribute;

executing an optimization function, the optimization function generating an optimized decision tree based at least in part on a plurality of comparisons of the user interface to the updated user interface resulting in the determination that the updated user interface lacks any stylistic errors, and based on comparisons of a subset of the interface elements to corresponding candidate elements.

13. The computer program product of claim 12, wherein the stored program instructions are stored in a computer readable storage device in a data processing system, and wherein the stored program instructions are transferred over a network from a remote data processing system.

14. The computer program product of claim 12, wherein the stored program instructions are stored in a computer readable storage device in a server data processing system, and wherein the stored program instructions are downloaded to a remote data processing system in response to a request over a network, wherein the stored program instructions are for use in a computer readable storage device associated with the remote data processing system, further comprising:

program instructions to meter a use of program instructions associated with the request; and program instructions to generate an invoice based on the metered use.

15. The computer program product of claim 12, the operations further comprising:

generating a first data structure for an element profile of the interface element in a non-volatile computer memory, wherein the generating of the first data structure comprises mapping the element attribute to the interface element.

16. The computer program product of claim 15, the operations further comprising:

detecting an element action of the interface element by activating the interface element during the first window of time and comparing views of the first series of views captured before and after the activating of the interface element.

17. A computer system comprising one or more processors and one or more computer readable storage media, and program instructions collectively stored on the one or more computer readable storage media, the program instructions executable by the one or more processors to cause the one or more processors to perform operations comprising:

generating, by rendering from an application executing on a data processing system, a user interface on a display apparatus, and by capturing from the rendering of the user interface a screen recording, a first sequence of image files corresponding to respective views of a first series of views of a user interface, the first sequence of image files being generated from frames of the screen recording during a first window of time;

causing, by executing a detecting instruction, a detection of an interface element in the first series of views of the user interface and an element attribute of the interface element, the element attribute being descriptive of a stylistic characteristic of the interface element;

updating at least one interface element of the user interface, the updating causing executing a second screen recording and automatically activating each element of the user interface during the second screen recording;

generating, responsive to rendering from the application executing on the data processing system an updated user interface from the application on the display apparatus and capturing from the rendering of the updated user interface the second screen recording, a second sequence of image files corresponding to respective views of a second series of views of the updated user interface during activating each element of the user interface, the second sequence of image files being generated from frames of the second screen recording during a second window of time, the second window of time occurring after a completion of the first window of time;

causing, by executing the detecting instruction, a detection of a candidate element in the second series of views of the updated user interface and a candidate element attribute of the candidate element;

establishing, in a decision tree, a correspondence between a first interface element and a first candidate element responsive to a multi-modal similarity score computed using a profile of the first interface element and a profile of the first candidate element, the multi-modal similarity score indicating that the first interface element is more similar to the first candidate element relative to a second candidate element;

executing, using the decision tree data structure that includes comparisons of all interface elements of the user interface to corresponding candidate elements of the updated user interface, a comparison function over all interface elements of the user interface to the corresponding elements of the updated user interface, the comparison function outputting a determination that the updated user interface lacks any stylistic errors, wherein the determining that the updated interface lacks any stylistic errors comprises determining that the candidate element matches the interface element based at least in part on a comparison of the candidate element attribute to the element attribute;

executing an optimization function, the optimization function generating an optimized decision tree based at least in part on a plurality of comparisons of the user interface to the updated user interface resulting in the determination that the updated user interface lacks any stylistic errors, and based on comparisons of a subset of the interface elements to corresponding candidate elements.

18. The computer system of claim 17, the operations further comprising:

generating a first data structure for an element profile of the interface element in a non-volatile computer memory, wherein the generating of the first data structure comprises mapping the element attribute to the interface element.

19. The computer system of claim 18, the operations further comprising:

detecting an element action of the interface element by activating the interface element during the first window of time and comparing views of the first series of views captured before and after the activating of the interface element.

* * * * *